(12) United States Patent
Lai et al.

(10) Patent No.: US 8,435,714 B2
(45) Date of Patent: *May 7, 2013

(54) SOLVENT-FREE EMULSION PROCESS USING ACOUSTIC MIXING

(75) Inventors: Zhen Lai, Webster, NY (US); Chieh-Min Cheng, Rochester, NY (US); Shigang Qiu, Toronto (CA); Emily L. Moore, Mississauga (CA); Tie Hwee Ng, Mississauga (CA)

(73) Assignee: Xerox Corporation, Norwalk, CT (US)

( * ) Notice: Subject to any disclaimer, the term of this patent is extended or adjusted under 35 U.S.C. 154(b) by 350 days.

This patent is subject to a terminal disclaimer.

(21) Appl. No.: 12/823,446

(22) Filed: Jun. 25, 2010

(65) Prior Publication Data

US 2010/0266949 A1 Oct. 21, 2010

Related U.S. Application Data

(63) Continuation-in-part of application No. 12/426,454, filed on Apr. 20, 2009, now Pat. No. 8,124,309.

(51) Int. Cl.
*G03G 9/08* (2006.01)
(52) U.S. Cl.
USPC .................................. 430/137.1; 430/137.18
(58) Field of Classification Search ............. 430/137.18, 430/137.1
See application file for complete search history.

(56) References Cited

U.S. PATENT DOCUMENTS

| | | |
|---|---|---|
| 3,590,000 A | 6/1971 | Palermiti et al. |
| 3,847,604 A | 11/1974 | Hagenbach et al. |
| 4,295,990 A | 10/1981 | Verbeek et al. |
| 4,298,672 A | 11/1981 | Lu |
| 4,338,390 A | 7/1982 | Lu |
| 4,935,326 A | 6/1990 | Creatura et al. |
| 4,937,166 A | 6/1990 | Creatura et al. |
| 5,236,629 A | 8/1993 | Mahabadi et al. |
| 5,330,874 A | 7/1994 | Mahabadi et al. |
| 5,346,797 A | 9/1994 | Kmiecik-Lawrynowicz et al. |
| 5,364,729 A | 11/1994 | Kmiecik-Lawrynowicz et al. |
| 5,403,693 A | 4/1995 | Patel et al. |
| 5,418,108 A | 5/1995 | Kmiecik-Lawrynowicz et al. |
| 5,501,935 A | 3/1996 | Patel et al. |
| 5,527,658 A | 6/1996 | Hopper et al. |
| 5,585,215 A | 12/1996 | Ong et al. |
| 5,650,255 A | 7/1997 | Ng et al. |
| 5,650,256 A | 7/1997 | Veregin et al. |
| 5,853,943 A | 12/1998 | Cheng et al. |
| 6,063,827 A | 5/2000 | Sacripante et al. |

(Continued)

OTHER PUBLICATIONS

Extended European Search Report issued in European Application No. 10159712.8-2012/2243800, dated Sep. 14, 2012, 5 pages.

*Primary Examiner* — Hoa V Le

(74) *Attorney, Agent, or Firm* — Marylou J. Lavoie

(57) ABSTRACT

A process for making toner particles is provided. In embodiments, a suitable process includes melt mixing a resin in the absence of an organic solvent, optionally adding a surfactant to the resin, adding to the resin at least one colorant and other optional toner additives, adding to the resin a basic agent and water to form a mixture, and subjecting the mixture to acoustic mixing at a suitable frequency to form to form an emulsion. A phase inversion may then be performed to create a phase inversed emulsion including a disperse phase comprising molten resin and the optional ingredients of the toner composition, at which time toner-sized droplets may be solidified from the disperse phase into toner particles, which can be recovered for use.

20 Claims, 3 Drawing Sheets

U.S. PATENT DOCUMENTS

| | | |
|---|---|---|
| 6,214,507 B1 | 4/2001 | Sokol et al. |
| 6,593,049 B1 | 7/2003 | Veregin et al. |
| 6,756,176 B2 | 6/2004 | Stegamat et al. |
| 6,830,860 B2 | 12/2004 | Sacripante et al. |
| 8,124,309 B2 * | 2/2012 | Lai et al. ............ 430/137.18 |
| 2002/0076639 A1 | 6/2002 | Uno et al. |
| 2007/0088119 A1 | 4/2007 | Kamiyoshi et al. |
| 2007/0259283 A1 * | 11/2007 | Abe et al. ............ 430/109.3 |

* cited by examiner

SOLVENT-FREE EMULSION PROCESS USING ACOUSTIC MIXING

RELATED APPLICATIONS

This application is a continuation in part of co-pending U.S. patent application Ser. No. 12/426,454, filed on Apr. 20, 2009, the disclosure of which is hereby incorporated by reference in its entirety.

BACKGROUND

The present disclosure relates to processes for producing resin emulsions useful in producing toners suitable for electrostatographic apparatuses.

Numerous processes are within the purview of those skilled in the art for the preparation of toners. Emulsion aggregation (EA) is one such method. These toners may be formed by aggregating a colorant with a latex polymer formed by emulsion polymerization. For example, U.S. Pat. No. 5,853,943, the disclosure of which is hereby incorporated by reference in its entirety, is directed to a semi-continuous emulsion polymerization process for preparing a latex by first forming a seed polymer. Other examples of emulsion/aggregation/coalescing processes for the preparation of toners are illustrated in U.S. Pat. Nos. 5,403,693, 5,418,108, 5,364,729, and 5,346,797, the disclosures of each of which are hereby incorporated by reference in their entirety. Other processes are disclosed in U.S. Pat. Nos. 5,527,658, 5,585,215, 5,650,255, 5,650,256 and 5,501,935, the disclosures of each of which are hereby incorporated by reference in their entirety.

Polyester EA toners have also been prepared utilizing emulsions prepared by solvent containing processes, for example solvent flash emulsification and solvent-based phase inversion emulsification. In both cases, large amounts of organic solvents such as ketones or alcohols may be used to dissolve the resins. The solvents need to be evaporated at the end of the emusification, which usually takes a long time to complete. Other drawbacks with these processes include: 1) the solvent containing process is not environmentally friendly; 2) waste treatment and solvent recovery adds extra cost to the EA toner process; and 3) the residual amount of solvent may vary, which may affect both the toner process and the toner produced by the process.

Improved methods for producing toners, which reduce the number of stages and materials, remain desirable. Such processes may reduce production costs for such toners and may be environmentally friendly.

SUMMARY

The present disclosure provides processes for making toners. In embodiments, a process of the present disclosure may include melt mixing a resin in the absence of an organic solvent; optionally adding a surfactant to the resin; adding one or more additional ingredients of a toner composition to the resin to form a mixture; adding to the mixture a basic agent and water; subjecting the mixture to acoustic mixing at a frequency of from about 15 Hertz to about 2000 Hertz to form an emulsion; performing a phase inversion to create a phase inversed emulsion including a disperse phase comprising molten resin and the optional ingredients of the toner composition; solidifying toner-sized droplets from the disperse phase into toner particles; and recovering the toner particles, wherein the toner particles have a volume average diameter of from about 2 microns to about 12 microns.

In other embodiments, a process of the present disclosure includes melt mixing a resin in the absence of an organic solvent; optionally adding a surfactant to the resin; adding a colorant and one or more additional optional ingredients of a toner composition to the resin to form a mixture; adding to the mixture a basic agent and water; subjecting the mixture to acoustic mixing at a frequency of from about 15 Hertz to about 2000 Hertz to form an emulsion; performing a phase inversion to create a phase inversed emulsion including a disperse phase comprising molten resin and the ingredients of the toner composition; solidifying toner-sized droplets from the disperse phase into toner particles; aggregating and coalescing the toner particles; and recovering the toner particles, wherein coalescing the toner particles occurs at a temperature of from about 50 to about 95° C. for a period of time of from about 0.1 hours to about 6 hours.

In other embodiments, a process of the present disclosure may include melt mixing at least one polyester resin in the absence of an organic solvent; optionally adding a surfactant to the resin; adding a colorant and one or more additional optional ingredients of a toner composition to the resin to form a mixture; adding to the mixture a basic agent and water; subjecting the mixture to acoustic mixing in an acoustic mixer lacking impellers at a frequency of from about 15 Hertz to about 2000 Hertz to form an emulsion; performing a phase inversion to create a phase inversed emulsion including a disperse phase comprising molten resin and the ingredients of the toner composition; solidifying toner-sized droplets from the disperse phase into toner particles; aggregating and coalescing the toner particles; and recovering the toner particles, wherein coalescing the toner particles occurs at a temperature of from about 50° C. to about 95° C. for a period of time of from about 0.1 hours to about 6 hours, and wherein the toner particles have a volume average diameter of from about 2 microns to about 12 microns, a Number Average Geometric Size Distribution of from about 1 to about 2, and a Volume Average Geometric Size Distribution of from about 1 to about 1.8.

BRIEF DESCRIPTION OF THE DRAWINGS

Various embodiments of the present disclosure will be described herein below with reference to the following figures wherein.

DETAILED DESCRIPTION

Figure 1:
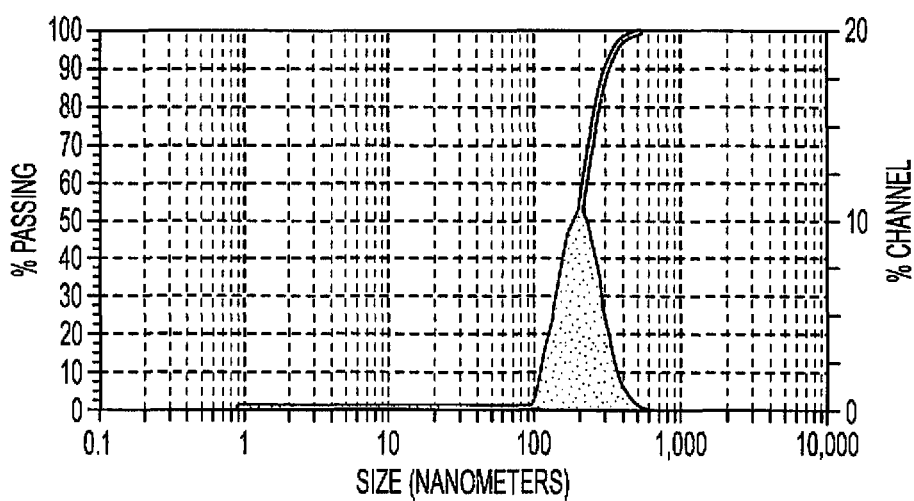
FIG. 1 is a graph showing the particle size and size distribution obtained for particles obtained from a phase inversed gel mixture produced in accordance with the present disclosure.

The present disclosure provides processes for producing resin emulsions which may be utilized to make toners. In embodiments, a process of the present disclosure includes melt mixing a resin in the absence of an organic solvent; adding a basic agent to the resin; and combining the resulting neutralized resin with an aqueous surfactant in an acoustic mixer or similar device to form an emulsion of particles of the resin.

The present disclosure also provides processes for producing toner particles. In embodiments, a process of the present disclosure includes melt mixing a resin in the absence of an organic solvent; adding a basic agent to the resin; combining the resulting neutralized resin with an aqueous surfactant in an acoustic mixer or similar device to form an emulsion of the resin particles; optionally adding one or more additional ingredients of a toner composition such as a colorant, wax, and other additives to the resin particles; and recovering the resulting toner particles. The acoustic mixer applies low frequency, high intensity, acoustic energy and provides complete mixing by applying a consistent shear field throughout the entire vessel, thereby ensuring mixing of the polymer and pigment melts and enabling the phase inversion aggregation process to form the toner particles directly from the polymer resin, pigment powder and wax, without predispersing them. Therefore, cost savings can be achieved by eliminating wax, pigment pre-dispersion and polyester resin emulsification.

As used herein, "the absence of an organic solvent" means that organic solvents are not used to dissolve the polyester resin for emulsification. However, it is understood that minor amounts of such solvents may be present in such resins as a consequence of their use in the process of forming the resin.

Resins

Any toner resin may be utilized in the processes of the present disclosure. Such resins, in turn, may be made of any suitable monomer or monomers via any suitable polymerization method. In embodiments, the resin may be prepared by a method other than emulsion polymerization. In further embodiments, the resin may be prepared by condensation polymerization.

In embodiments, the resin may be a polyester, polyimide, polyolefin, polyamide, polycarbonate, epoxy resin, and/or copolymers thereof. In embodiments, the resin may be an amorphous resin, a crystalline resin, and/or a mixture of crystalline and amorphous resins. The crystalline resin may be present in the mixture of crystalline and amorphous resins, for example, in an amount of from 0 to about 50 percent by weight of the total toner resin, in embodiments from 5 to about 35 percent by weight of the toner resin. The amorphous resin may be present in the mixture, for example, in an amount of from about 50 to about 100 percent by weight of the total toner resin, in embodiments from 95 to about 65 percent by weight of the toner resin. In embodiments, the resin may be a polyester crystalline and/or a polyester amorphous resin.

In embodiments, the polymer utilized to form the resin may be a polyester resin, including the resins described in U.S. Pat. Nos. 6,593,049 and 6,756,176, the disclosures of each of which are hereby incorporated by reference in their entirety. Suitable resins may also include a mixture of an amorphous polyester resin and a crystalline polyester resin as described in U.S. Pat. No. 6,830,860, the disclosure of which is hereby incorporated by reference in its entirety.

In embodiments, the resin may be a polyester resin formed by reacting a diol with a diacid in the presence of an optional catalyst. For forming a crystalline polyester, suitable organic diols include aliphatic diols with from about 2 to about 36 carbon atoms, such as 1,2-ethanediol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, ethylene glycol, combinations thereof, and the like. The aliphatic diol may be, for example, selected in an amount of from about 40 to about 60 mole percent, in embodiments from about 42 to about 55 mole percent, in embodiments from about 45 to about 53 mole percent of the resin, although the amounts can be outside of these ranges.

Examples of organic diacids or diesters selected for the preparation of the crystalline resins include oxalic acid, succinic acid, glutaric acid, adipic acid, suberic acid, azelaic acid, fumaric acid, maleic acid, dodecanedioic acid, sebacic acid, phthalic acid, isophthalic acid, terephthalic acid, naphthalene-2,6-dicarboxylic acid, naphthalene-2,7-dicarboxylic acid, cyclohexane dicarboxylic acid, malonic acid and mesaconic acid, a diester or anhydride thereof, and combinations thereof. The organic diacid may be selected in an amount of, for example, in embodiments from about 40 to about 60 mole percent, in embodiments from about 42 to about 55 mole percent, in embodiments from about 45 to about 53 mole percent, although the amounts can be outside of these ranges.

Examples of crystalline resins include polyesters, polyamides, polyimides, polyolefins, polyethylene, polybutylene, polyisobutyrate, ethylene-propylene copolymers, ethylene-vinyl acetate copolymers, polypropylene, mixtures thereof, and the like. Specific crystalline resins may be polyester based, such as poly(ethylene-adipate), polypropylene-adipate), poly(butylene-adipate), poly(pentylene-adipate), poly(hexylene-adipate), poly(octylene-adipate), poly(ethylene-succinate), poly(propylene-succinate), poly(butylene-succinate), poly(pentylene-succinate), poly(hexylene-succinate), poly(octylene-succinate), poly(ethylene-sebacate), poly(propylene-sebacate), poly(butylene-sebacate), poly(pentylene-sebacate), poly(hexylene-sebacate), poly(octylene-sebacate), alkali copoly(5-sulfoisophthaloyl)-copoly(ethylene-adipate), poly(decylene-sebacate), poly(decylene-decanoate), poly-(ethylene-decanoate), poly-(ethylene-dodecanoate), poly(nonylene-sebacate), poly (nonylene-decanoate), copoly(ethylene-fumarate)-copoly(ethylene-sebacate), copoly(ethylene-fumarate)-copoly(ethylene-decanoate), and copoly(ethylene-fumarate)-copoly(ethylene-dodecanoate). The crystalline resin may be present, for example, in an amount of from about 5 to about 50 percent by weight of the toner components, in embodiments from about 10 to about 35 percent by weight of the toner components, although the amounts can be outside of these ranges.

The crystalline resin can possess various melting points of, for example, from about 30° C. to about 120° C., in embodiments from about 50° C. to about 90° C., although the melting point can be outside of these ranges. The crystalline resin may have a number average molecular weight (Mn), as measured by gel permeation chromatography (GPC) of, for example, from about 1,000 to about 50,000, in embodiments from about 2,000 to about 25,000 (although the Mn can be outside of these ranges), and a weight average molecular weight (Mw) of, for example, from about 2,000 to about 100,000, in embodiments from about 3,000 to about 80,000 (although the Mw can be outside of these ranges), as determined by Gel Permeation Chromatography using polystyrene standards. The molecular weight distribution (Mw/Mn) of the crystalline resin may be, for example, from about 2 to about 6, in embodiments from about 3 to about 4, although the molecular weight distribution can be outside of these ranges.

Examples of diacid or diesters selected for the preparation of amorphous polyesters include dicarboxylic acids or diesters such as terephthalic acid, phthalic acid, isophthalic acid, fumaric acid, maleic acid, succinic acid, itaconic acid, succinic acid, succinic anhydride, dodecylsuccinic acid, dodecylsuccinic anhydride, glutaric acid, glutaric anhydride, adipic acid, pimelic acid, suberic acid, azelaic acid, dodecanediacid, dimethyl terephthalate, diethyl terephthalate, dimethylisophthalate, diethylisophthalate, dimethylphthalate, phthalic anhydride, diethylphthalate, dimethylsuccinate, dimethylfumarate, dimethylmaleate, dimethylglutarate, dimethyladipate, dimethyl dodecylsuccinate, and combinations thereof. The organic diacid or diester may be present, for example, in an amount from about 40 to about 60 mole percent of the resin, in embodiments from about 42 to about 55 mole percent of the resin, in embodiments from about 45 to about 53 mole percent of the resin, although the amounts can be outside of these ranges.

Examples of diols utilized in generating the amorphous polyester include 1,2-propanediol, 1,3-propanediol, 1,2-butanediol, 1,3-butanediol, 1,4-butanediol, pentanediol, hexanediol, 2,2-dimethylpropanediol, 2,2,3-trimethylhexanediol, heptanediol, dodecanediol, bis(hydroxyethyl)-bisphenol A, bis(2-hydroxypropyl)-bisphenol A, 1,4-cyclohexanedimethanol, 1,3-cyclohexanedimethanol, xylenedimethanol, cyclohexanediol, diethylene glycol, bis(2-hydroxyethyl) oxide, dipropylene glycol, dibutylene, and combinations thereof The amount of organic diol selected can vary, and may be present, for example, in an amount from about 40 to about 60 mole percent of the resin, in embodiments from about 42 to about 55 mole percent of the resin, in embodiments from about 45 to about 53 mole percent of the resin, although the amounts can be outside of these ranges.

In embodiments, polycondensation catalysts may be used in forming the polyesters. Polycondensation catalysts which may be utilized for either the crystalline or amorphous polyesters include tetraalkyl titanates, dialkyltin oxides such as dibutyltin oxide, tetraalkyltins such as dibutyltin dilaurate, and dialkyltin oxide hydroxides such as butyltin oxide hydroxide, aluminum alkoxides, alkyl zinc, dialkyl zinc, zinc oxide, stannous oxide, or combinations thereof. Such catalysts may be utilized in amounts of, for example, from about 0.01 mole percent to about 5 mole percent based on the starting diacid or diester used to generate the polyester resin, although the amounts can be outside of these ranges.

In embodiments, suitable amorphous resins include polyesters, polyamides, polyimides, polyolefins, polyethylene, polybutylene, polyisobutyrate, ethylene-propylene copolymers, ethylene-vinyl acetate copolymers, polypropylene, combinations thereof, and the like. Examples of amorphous resins which may be utilized include alkali sulfonated-polyester resins, branched alkali sulfonated-polyester resins, alkali sulfonated-polyimide resins, and branched alkali sulfonated-polyimide resins. Alkali sulfonated polyester resins may be useful in embodiments, such as the metal or alkali salts of copoly(ethylene-terephthalate)-copoly(ethylene-5-sulfo-isophthalate), copoly(propylene-terephthalate)-copoly(propylene-5-sulfo-isophthalate), copoly(diethylene-terephthalate)-copoly(diethylene-5-sulfo-isophthalate), copoly(propylene-diethylene-terephthalate)-copoly(propylene-diethylene-5-sulfoisophthalate), copoly(propylene-butylene-terephthalate)-copoly(propylene-butylene-5-sulfo-isophthalate), and copoly(propoxylated bisphenol-A-fumarate)-copoly(propoxylated bisphenol A-5-sulfo-isophthalate).

In embodiments, an unsaturated, amorphous polyester resin may be utilized as a latex resin. Examples of such resins include those disclosed in U.S. Pat. No. 6,063,827, the disclosure of which is hereby incorporated by reference in its entirety. Exemplary unsaturated amorphous polyester resins include, but are not limited to, poly(propoxylated bisphenol co-fumarate), poly(ethoxylated bisphenol co-fumarate), poly(butyloxylated bisphenol co-fumarate), poly(co-propoxylated bisphenol co-ethoxylated bisphenol co-fumarate), poly(1,2-propylene fumarate), poly(propoxylated bisphenol co-maleate), poly(ethoxylated bisphenol co-maleate), poly(butyloxylated bisphenol co-maleate), poly(co-propoxylated bisphenol co-ethoxylated bisphenol co-maleate), poly(1,2-propylene maleate), poly (propoxylated bisphenol co-itaconate), poly(ethoxylated bisphenol co-itaconate), poly(butyloxylated bisphenol co-itaconate), poly(co-propoxylated bisphenol co-ethoxylated bisphenol co-itaconate), poly(1,2-propylene itaconate), and combinations thereof.

The amorphous resin can possess various glass transition temperatures (Tg) of, for example, from about 40° C. to about 100° C., in embodiments from about 50° C. to about 70° C. The crystalline resin may have a number average molecular weight ($M_n$), for example, from about 1,000 to about 50,000, in embodiments from about 2,000 to about 25,000, and a weight average molecular weight ($M_w$) of, for example, from about 2,000 to about 100,000, in embodiments from about 3,000 to about 80,000, as determined by Gel Permeation Chromatography (GPC) using polystyrene standards. The molecular weight distribution ($M_w/M_n$) of the crystalline resin may be, for example, from about 2 to about 6, in embodiments from about 3 to about 4.

In embodiments, a suitable amorphous polyester resin may be a poly(propoxylated bisphenol A co-fumarate) resin having the following formula (I):

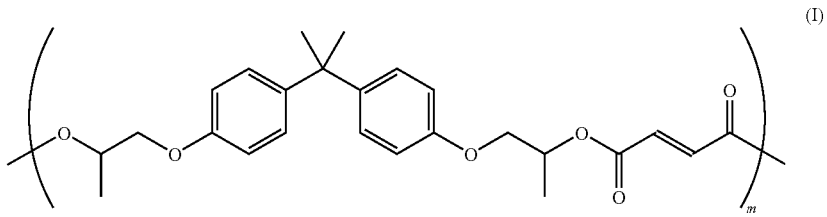

wherein m may be from about 5 to about 1000, in embodiments from about 10 to about 500, in other embodiments from about 15 to about 200, although the value of m can be outside of this range. Examples of such resins and processes for their production include those disclosed in U.S. Pat. No. 6,063,827, the disclosure of which is hereby incorporated by reference in its entirety.

An example of a linear propoxylated bisphenol A fumarate resin which may be utilized as a toner resin is available under the trade name SPARII from Resana SIA Industrias Quimicas, Sao Paulo Brazil. Other propoxylated bisphenol A fumarate resins that may be utilized and are commercially available include GTUF and FPESL-2 from Kao Corporation, Japan, and EM181635 from Reichhold, Research Triangle Park, North Carolina and the like.

Suitable crystalline resins include those disclosed in U.S. Patent Application Publication No. 2006/0222991, the disclosure of which is hereby incorporated by reference in its entirety. In embodiments, a suitable crystalline resin may be composed of ethylene glycol and a mixture of dodecanedioic acid and fumaric acid co-monomers with the following formula:

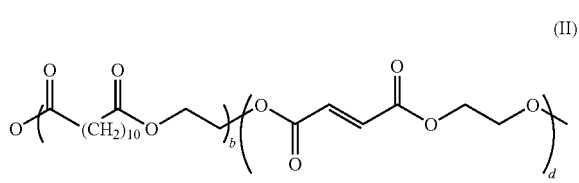

(II)

wherein b is from about 5 to about 2000 and d is from about 5 to about 2000.

Examples of other suitable toner resins or polymers which may be utilized to form a toner in accordance with the present disclosure include, but are not limited to, poly(styrene-butadiene), poly(methylstyrene-butadiene), poly(methyl methacrylate-butadiene), poly(ethyl methacrylate-butadiene), poly(propyl methacrylate-butadiene), poly(butyl methacrylate-butadiene), poly(methyl acrylate-butadiene), poly(ethyl acrylate-butadiene), poly(propyl acrylate-butadiene), poly(butyl acrylate-butadiene), poly(styrene-isoprene), poly(methylstyrene-isoprene), poly(methyl methacrylate-isoprene), poly(ethyl methacrylate-isoprene), poly(propyl methacrylate-isoprene), poly(butyl methacrylate-isoprene), poly(methyl acrylate-isoprene), poly(ethyl acrylate-isoprene), poly(propyl acrylate-isoprene), poly(butyl acrylate-isoprene); poly(styrene-propyl acrylate), poly(styrene-butyl acrylate), poly(styrene-butadiene-acrylic acid), poly(styrene-butadiene-methacrylic acid), poly(styrene-butadiene-acrylonitrile-acrylic acid), poly(styrene-butyl acrylate-acrylic acid), poly(styrene-butyl acrylate-methacrylic acid), poly(styrene-butyl acrylate-acrylonitrile), and poly(styrene-butyl acrylate-acrylonitrile-acrylic acid), and combinations thereof. The polymer may be block, random, or alternating copolymers.

One, two, or more toner resins may be used. In embodiments where two or more toner resins are used, the toner resins may be in any suitable ratio (e.g., weight ratio) such as for instance about 10% (first resin)/90% (second resin) to about 90% (first resin)/10% (second resin). Where the resins include a combination of amorphous and crystalline resins, the resins may be in a weight ratio of, for example, from about 1% (crystalline resin)/99% (amorphous resin) to about 99% (crystalline resin)/1% (amorphous resin), in embodiments from about 10% (crystalline resin)/90% (amorphous resin) to about 90% (crystalline resin)/10% (amorphous resin). In some embodiments, the weight ratio of the resins may be from about 99% to about 90% of the amorphous resin, to from about 1% to about 10% of the crystalline resin.

In embodiments the resin may possess acid groups which, in embodiments, may be present at the terminal of the resin. Acid groups which may be present include carboxylic acid groups, and the like. The number of carboxylic acid groups may be controlled by adjusting the materials utilized to form the resin and reaction conditions.

In embodiments, the resin may be a polyester resin having an acid number from about 2mg KOH/g of resin to about 200 mg KOH/g of resin, in embodiments from about 5 mg KOH/g of resin to about 50 mg KOH/g of resin. The acid containing resin may be dissolved in tetrahydrofuran solution. The acid number may be detected by titration with KOH/methanol solution containing phenolphthalein as the indicator. The acid number may then be calculated based on the equivalent amount of KOH/methanol required to neutralize all the acid groups on the resin identified as the end point of the titration.

In embodiments, a pre-made resin may be utilized to form the resin emulsion.

Basic Agent

Once obtained, the resin may be melt-mixed at an elevated temperature, and at least one base or basic agent may be added thereto. The base may be a solid or, in embodiments, added in the form of an aqueous solution. In embodiments, an aqueous alkaline solution may include water, in embodiments deionized water (DIW), and at least one basic agent to provide the aqueous alkaline solution with an alkaline pH. In embodiments, the basic agent is used to neutralize acid groups in the resins, so a basic agent herein may also be referred to as a "basic neutralization agent." Any suitable basic neutralization agent may be used in accordance with the present disclosure. In embodiments, suitable basic neutralization agents include both inorganic basic agents and organic basic agents. Exemplary basic agents include ammonium hydroxide, potassium hydroxide, sodium hydroxide, sodium carbonate, sodium bicarbonate, lithium hydroxide, potassium carbonate, organoamines such as triethyl amine, combinations thereof, and the like.

The basic agent may be present in an amount of from about 0.001% by weight to about 100% (pure basic agent) by weight of the aqueous alkaline solution, in embodiments from about 0.01% by weight to 95% by weight of the aqueous alkaline solution, in embodiments from about 0.001% by weight to about 10% by weight of the aqueous alkaline solution, in embodiments from about 0.01% by weight to about 1% by weight of the aqueous alkaline solution, or in embodiments from about 50% to about 100% by weight of the aqueous alkaline solution.

Utilizing the above basic neutralization agent in combination with a resin possessing acid groups, a neutralization ratio of from about 50% to about 300% may be achieved, in embodiments from about 70% to about 200%. In embodiments, the neutralization ratio may be calculated using the following equation:

Neutralization ratio in an equivalent amount of 10% $NH_3$/resin(g)/resin acid value/0.303*100.

As noted above, the basic neutralization agent may be added to a resin possessing acid groups. The addition of the basic neutralization agent may thus raise the pH of an emulsion including a resin possessing acid groups to from about 5 to about 9, in embodiments from about 6 to about 8. The neutralization of the acid groups may, in embodiments, enhance formation of the emulsion.

Surfactants

In embodiments, the process of the present disclosure optionally includes adding a surfactant before, during, or after, melt-mixing the resin at an elevated temperature. In embodiments, the surfactant may be added after melt-mixing the resin at an elevated temperature. Where utilized, a resin emulsion may include one, two, or more surfactants. The surfactants may be selected from ionic surfactants and nonionic surfactants. Anionic surfactants and cationic surfactants are encompassed by the term "ionic surfactants." In embodiments, the surfactant may be added as an aqueous solution with a concentration from about 5% to about 100% (pure surfactant) by weight, or from about 30% to about 95% by weight. In embodiments, the surfactant may be utilized so that it is present in an amount of from about 0.01% to about 20% by weight of the resin, for example from about 0.1% to about 10% by weight of the resin, in embodiments from about 1% to about 8% by weight of the resin.

Examples of nonionic surfactants that can be utilized for the processes illustrated herein and that may be included in the emulsion are, for example, polyacrylic acid, methalose, methyl cellulose, ethyl cellulose, propyl cellulose, hydroxy ethyl cellulose, carboxy methyl cellulose, polyoxyethylene cetyl ether, polyoxyethylene lauryl ether, polyoxyethylene octyl ether, polyoxyethylene octylphenyl ether, polyoxyethylene oleyl ether, polyoxyethylene sorbitan monolaurate, polyoxyethylene stearyl ether, polyoxyethylene nonyiphenyl ether, dialkylphenoxy poly(ethyleneoxy) ethanol, available from Rhone-Poulenc as IGEPAL CA-210™, IGEPAL CA520™, IGEPAL CA720™, IGEPAL CO-890™, IGEPAL CO-720™, IGEPAL CO-290™, IGEPAL CA-210™, ANTAROX 890™ and ANTAROX 897™. Other examples of suitable nonionic surfactants include a block copolymer of polyethylene oxide and polypropylene oxide, including those commercially available as SYNPERONIC PE/F, in embodiments SYNPERONIC PE/F 108.

Anionic surfactants which may be utilized include sulfates and sulfonates, sodium dodecylsulfate (SDS), sodium dodecylbenzene sulfonate, sodium dodecylnaphthalene sulfate, dialkyl benzenealkyl sulfates and sulfonates, acids such as abitic acid available from Aldrich, NEOGEN R™, NEOGEN SC™ obtained from Daiichi Kogyo Seiyaku, combinations thereof, and the like. Other suitable anionic surfactants include, in embodiments, DOWFAX™ 2A1, an alkyldiphenyloxide disulfonate from The Dow Chemical Company, and/ or TAYCA POWER BN2060 from Tayca Corporation (Japan), which are branched sodium dodecyl benzene sulfonates. Combinations of these surfactants and any of the foregoing anionic surfactants may be utilized in embodiments.

Examples of the cationic surfactants, which are usually positively charged, include, for example, alkylbenzyl dimethyl ammonium chloride, dialkyl benzenealkyl ammonium chloride, lauryl trimethyl ammonium chloride, alkylbenzyl methyl ammonium chloride, alkyl benzyl dimethyl ammonium bromide, benzalkonium chloride, cetyl pyridinium bromide, $C_{12}$, $C_{15}$, $C_{17}$ trimethyl ammonium bromides, halide salts of quaternized polyoxyethylalkylamines, dodecylbenzyl triethyl ammonium chloride, MIRAPOL™ and ALKAQUAT™, available from Alkaril Chemical Company, SANIZOL™ (benzalkonium chloride), available from Kao Chemicals, and the like, and mixtures thereof.

Colorants

As the colorant to be added, various known suitable colorants, such as dyes, pigments, mixtures of dyes, mixtures of pigments, mixtures of dyes and pigments, and the like, may be included in the toner. The colorant may be included in the toner in an amount of, for example, about 0.1 to about 35 percent by weight of the toner, or from about 1 to about 20 weight percent of the toner, or from about 3 to about 15 percent by weight of the toner.

As examples of suitable colorants, mention may be made of carbon black like REGAL 330®; magnetites, such as Mobay magnetites MO8029™, MO8060™; Columbian magnetites; MAPICO BLACKS™ and surface treated magnetites; Pfizer magnetites CB4799™, CB5300™, CB5600™, MCX6369™; Bayer magnetites, BAYFERROX 8600™, 8610™; Northern Pigments magnetites, NP604™, NP608™; Magnox magnetites TMB-100™, or TMB-104™; and the like. As colored pigments, there can be selected cyan, magenta, yellow, red, green, brown, blue or mixtures thereof. Generally, cyan, magenta, or yellow pigments or dyes, or mixtures thereof, are used. The pigment or pigments are generally used as water based pigment dispersions.

Specific examples of pigments include SUNSPERSE 6000, FLEXIVERSE and AQUATONE water based pigment dispersions from SUN Chemicals, HELIOGEN BLUE L6900™, D6840™, D7080™, D7020™, PYLAM OIL BLUE™, PYLAM OIL YELLOW™, PIGMENT BLUE 1™ available from Paul Uhlich & Company, Inc., PIGMENT VIOLET 1™, PIGMENT RED 48™, LEMON CHROME YELLOW DCC 1026™, E.D. TOLUIDINE RED™ and BON RED C™ available from Dominion Color Corporation, Ltd., Toronto, Ontario, NOVAPERM YELLOW FGL™, HOSTAPERM PINK E™ from Hoechst, and CINQUASIA MAGENTA™ available from E.I. DuPont de Nemours & Company, and the like. Generally, colorants that can be selected are black, cyan, magenta, or yellow, and mixtures thereof. Examples of magentas are 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyans include copper tetra(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like. Illustrative examples of yellows are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK™, and cyan components may also be selected as colorants. Other known colorants can be selected, such as Levanyl Black A-SF (Miles, Bayer) and Sunsperse Carbon Black LHD 9303 (Sun Chemicals), and colored dyes such as Neopen Blue (BASF), Sudan Blue OS (BASF), PV Fast Blue B2G01 (American Hoechst), Sunsperse Blue BHD 6000 (Sun Chemicals), Irgalite Blue BCA (Ciba-Geigy), Paliogen Blue 6470 (BASF), Sudan III (Matheson, Coleman, Bell), Sudan II (Matheson, Coleman, Bell), Sudan IV (Matheson, Coleman, Bell), Sudan Orange G (Aldrich), Sudan Orange 220 (BASF), Paliogen Orange 3040 (BASF), Ortho Orange OR 2673 (Paul Uhlich), Paliogen Yellow 152, 1560 (BASF), Lithol Fast Yellow 0991K (BASF), Paliotol Yellow 1840 (BASF), Neopen Yellow (BASF), Novoperm Yellow FG 1 (Hoechst), Permanent Yellow YE 0305 (Paul Uhlich), Lumogen Yellow D0790 (BASF), Sunsperse Yellow YHD 6001 (Sun Chemicals), Suco-Gelb L1250 (BASF), Suco-Yellow D1355 (BASF), Hostaperm Pink E (American Hoechst), Fanal Pink D4830 (BASF), Cinquasia Magenta (DuPont), Lithol Scarlet D3700 (BASF), Toluidine Red (Aldrich), Scarlet for Thermoplast NSD PS PA (Ugine Kuhlmann of Canada), E.D. Toluidine Red (Aldrich), Lithol Rubine Toner (Paul Uhlich), Lithol Scarlet 4440 (BASF), Bon Red C (Dominion Color Company), Royal Brilliant Red RD-8192 (Paul Uhlich), Oracet Pink RF (Ciba-Geigy), Paliogen Red 3871K (BASF), Paliogen Red 3340 (BASF), Lithol Fast Scarlet L4300 (BASF), combinations of the foregoing, and the like.

Wax

Optionally, a wax may also be included with the resin emulsion, or combined with the resin and a colorant in forming toner particles. When included, the wax may be present in an amount of, for example, from about 1 weight percent to about 30 weight percent of the toner particles, in embodiments from about 5 weight percent to about 25 weight percent of the toner particles.

Waxes that may be selected include waxes having, for example, a weight average molecular weight of from about 500 to about 20,000, in embodiments from about 1,000 to about 10,000. Waxes that may be used include, for example, polyolefins such as polyethylene, polypropylene, and polybutene waxes such as commercially available from Allied Chemical and Petrolite Corporation, for example POLY- WAX™ polyethylene waxes from Baker Petrolite, wax emulsions available from Michaelman, Inc. and the Daniels Products Company, EPOLENE N-15™ commercially available from Eastman Chemical Products, Inc., and VISCOL 550P™, a low weight average molecular weight polypropylene available from Sanyo Kasei K. K.; plant-based waxes, such as carnauba wax, rice wax, candelilla wax, sumacs wax, and jojoba oil; animal-based waxes, such as beeswax; mineral-based waxes and petroleum-based waxes, such as montan wax, ozokerite, ceresin, paraffin wax, microcrystalline wax, and Fischer-Tropsch wax; ester waxes obtained from higher fatty acid and higher alcohol, such as stearyl stearate and behenyl behenate; ester waxes obtained from higher fatty acid and monovalent or multivalent lower alcohol, such as butyl stearate, propyl oleate, glyceride monostearate, glyceride distearate, and pentaerythritol tetra behenate; ester waxes obtained from higher fatty acid and multivalent alcohol multimers, such as diethyleneglycol monostearate, dipropyleneglycol distearate, diglyceryl distearate, and triglyceryl tetrastearate; sorbitan higher fatty acid ester waxes, such as sorbitan monostearate, and cholesterol higher fatty acid ester waxes, such as cholesteryl stearate. Examples of functionalized waxes that may be used include, for example, amines, amides, for example AQUA SUPERSLIP 6550™, SUPERSLIP 6530™ available from Micro Powder Inc., fluorinated waxes, for example POLYFLUO 190™, POLYFLUO 200™, POLYSILK 19™, POLYSILK 14™ available from Micro Powder Inc., mixed fluorinated, amide waxes, for example MICROSPERSION 19™ also available from Micro Powder Inc., imides, esters, quaternary amines, carboxylic acids or acrylic polymer emulsion, for example JONCRYL 74™, 89™, 130™, 537™, and 538™, all available from SC Johnson Wax, and chlorinated polypropylenes and polyethylenes available from Allied Chemical and Petrolite Corporation and SC Johnson wax. Mixtures of waxes may also be used. Waxes may be included as, for example, fuser roll release agents.

Processing

As noted above, the present process includes melt mixing a resin at an elevated temperature, wherein an organic solvent is not utilized in the process. More than one resin may be utilized. The resin may be an amorphous resin, a crystalline resin, or a combination thereof. In embodiments, the resin may be an amorphous resin and the elevated temperature may be a temperature above the glass transition temperature of the resin. In other embodiments, the resin may be a crystalline resin and the elevated temperature is a temperature above the melting point of the resin. In further embodiments, the resin may be a mixture of amorphous and crystalline resins and the temperature may be above the glass transition temperature of the mixture.

Suitable acoustic mixers are within the purview of those skilled in the art. In embodiments, an acoustic mixer may include a closed vessel without impellers, which uses low-frequency, high intensity acoustic energy to provide the desired mixing.

Issues that may arise with the use of conventional mixers that possess impellers include, but are not limited to, a moderate mixing cycle; limited high-viscosity mixing capability; viscous heating; limited filler loading capability; high shear localized mixing; it requires contact mixing, and thus impeller cleaning is an additional step that must be utilized in the process; and the process includes mixing and transferring to a container, followed by shipping.

To the contrary, advantages to be found by using an acoustic mixer include, but are not limited to, fast mixing cycle; excellent high-viscosity mixing capability; low heat generation; high rate of filler loading; high intensity mixing throughout the volume of material to be mixed; non-contact, hygienic, sealed mixing; and a shorter process, as mixing may occur in the container possessing the material, which is then shipped.

The selected acoustic mixer in accordance with the present disclosure provides intimate mixing by applying a consistent shear field throughout the entire vessel, and thus may be especially suitable for the mixing of viscous polymer melts.

In embodiments, a suitable acoustic mixer for use in accordance with the present disclosure include LABRAM mixers and RESONANTACOUSTIC® mixers, without impellers, commercially available from Resodyn Acoustic Mixers, Inc. (Butte, Mont.) The acoustic mixer is operated on a resonant frequency. A closely controlled electromechanical oscillator is used to excite the mix material. The acoustic mixer may operate at a frequency of from about 15 Hertz to about 2000 Hertz, in embodiments from about 30 Hertz to about 1000 Hertz. The entire system may oscillate in resonance, allowing highly efficient energy transfer and rapid mixing of the components of the polymer melt.

In embodiments, an acoustic mixer may handle polymer melts with a viscosity up to about 100 million centipoise (cP), in embodiments from about 1 million cP to about 80 million cP. Compared with an impeller-based mixer, an acoustic mixer can easily achieve good melt mixing within a very short time, in embodiments from about 1 minute to about 300 minutes, in other embodiments from about 2 minutes to about 60 minutes.

In embodiments, pre-mixing, which may include melting the dry resins, pigments, waxes, and other ingredients, at a temperature above the glass transition temperature (Tg) of the resin may occur in an acoustic mixer operating on a resonant frequency.

Thus, in embodiments, the process of making the resin emulsion may include heating at least one resin to an elevated temperature, in embodiments above the glass transition temperature of the resin, stirring the mixture, and, while maintaining the temperature at the elevated temperature, optionally metering aqueous alkaline solution into the mixture. Acidic carboxyl groups contained in the polyester resin may be neutralized partially by reacting with the aqueous alkaline solution. After neutralization, the hydrophilicity and therefore the emulsifiability of the resin will be increased. The degree of neutralization can be controlled by adjusting the amount of aqueous alkaline solution added to the resin.

Emulsification may then occur with a preheated surfactant solution in a suitable reactor, in embodiments utilizing an acoustic mixer, capable of generating high intensity acoustic energy for mixing without impellers.

In embodiments, the partially neutralized melt resin, with optional pigment and optional wax, may be mixed with the preheated surfactant aqueous solution, which may be pumped into a container at a controlled rate. A preheated surfactant solution may reduce the cycle time of the process and minimize any polyester crystallization. The operation temperature of emulsification should be at least 20° C. above the polyester melting point to allow the proper flow and enough emulsification.

The final polyester particles size and size distribution may be controlled by adjusting the degree of carboxyl group neutralization, the amount of surfactant, and total residence time in the container subjected to acoustic mixing. In practice, a final particle size of from about 50 nm to about 3 microns can be achieved, in embodiments from about 100 nm to about 2 microns.

As noted above, in embodiments the container holding the resin components may be placed in an acoustic mixing device, mixed, and then shipped without ever removing the resin material from the container in which mixing occurred.

In embodiments, a surfactant may be added to the one or more ingredients of the resin composition before, during, or after melt-mixing, thereby enhancing formation of an emulsion of the present disclosure. In embodiments, a surfactant may be added before, during, or after the addition of the basic agent. In embodiments, the surfactant may be added prior to the addition of the basic agent. In other embodiments, water may be subsequently added in forming the emulsion. The addition of aqueous alkaline solution, optional surfactant and/or water forms an emulsion including a disperse phase possessing droplets of the surfactant and/or water composition and a continuous phase including the molten ingredients of the resin.

In embodiments, a phase inversed emulsion may be formed. Phase inversion can be accomplished by continuing to add the aqueous alkaline solution, optional surfactant and/or water compositions to create a phase inversed emulsion including a disperse phase including droplets possessing the molten ingredients of the resin composition and a continuous phase including the surfactant and/or water composition.

In embodiments, a process of the present disclosure may include heating one or more ingredients of a resin composition to an elevated temperature, stirring the resin composition, and, while maintaining the temperature at the elevated temperature, adding the base, optionally in an aqueous alkaline solution, and optional surfactant into the mixture to enhance formation of the emulsion including a disperse phase and a continuous phase including the resin composition, and continuing to add the aqueous alkaline solution and optional surfactant until phase inversion occurs to form the phase inversed emulsion.

In the above-mentioned heating, the heating to an elevated temperature may be to a temperature of from about 30° C. to about 300° C., in embodiments from about 50° C. to about 200° C., in other embodiments from about 70° C. to about 150° C. The heating need not be held at a constant temperature, but may be varied. For example, the heating may be slowly or incrementally increased during heating until a desired temperature is achieved.

While the temperature is maintained at the desired level, the aqueous alkaline composition and optional surfactant may be metered into the heated mixture at least until phase inversion is achieved. In other embodiments, the aqueous alkaline composition and optional surfactant may be metered into the heated mixture, followed by the addition of an aqueous solution, in embodiments deionized water, until phase inversion is achieved.

In embodiments, the process of the present disclosure may include subjecting the resin to a frequency of from about 15 Hertz to about 2000 Hertz, in embodiments from about 30 Hertz to about 1000 Hertz, during heating to the molten state in the acoustic mixer, and subjecting the resin to a frequency of from about 15 Hertz to about 2000 Hertz, in embodiments from about 30 Hertz to about 800 Hertz, during the addition of any surfactant and the aqueous alkaline composition to perform the phase inversion.

As noted above, in accordance with the present disclosure, an aqueous alkaline solution may be added to the resin after it has been melt mixed. The addition of an aqueous alkaline solution may be useful, in embodiments, where the resin utilized possesses acid groups. The aqueous alkaline solution may neutralize the acidic groups of the resin, thereby enhancing the formation of the phase-inversed emulsion and formation of particles suitable for use in forming toner compositions.

Prior to addition, the basic neutralization agent may be at any suitable temperature, including room temperature of from about 20° C. to about 25° C., or an elevated temperature, for example, the elevated temperature mentioned above.

In embodiments, the basic neutralization agent and optional surfactant may be added at a rate of from about 0.01% to about 10% by weight of the resin every 10 minutes, in embodiments from about 0.5% to about 5% by weight of the resin every 10 minutes, in other embodiments from about 1% to about 4% by weight of the resin every 10 minutes. The rate of addition of the basic neutralization agent and optional surfactant need not be constant, but can be varied. Thus, for example, for a 700 gram toner resin, the aqueous alkaline composition and optional surfactant may be added at a rate of from about 0.07 grams to about 70 grams every 10 minutes, in embodiments from about 3.5 grams to about 35 grams every 10 minutes, in other embodiments from about 7 grams to about 28 grams every 10 minutes.

In embodiments, where the process further includes adding water after the addition of basic neutralization agent and optional surfactant, the water may be metered into the mixture at a rate of from about 0.01% to about 10% by weight of the resin every 10 minutes, in embodiments from about 0.5% to about 5% by weight of the resin every 10 minutes, in other embodiments from about 1% to about 4% by weight of the resin every 10 minutes. The rate of water addition need not be constant, but can be varied. Thus, for example, for a 700 gram mixture of resins and surfactant(s), the water may be added at a rate of from about 0.07 gram to about 70 grams every 10 minutes, in embodiments from about 3.5 to about 35 grams every 10 minutes, in other embodiments from about 7 to about 28 grams every 10 minutes.

Although the point of phase inversion may vary depending on the components of the emulsion, the temperature of heating, the mixing frequency, and the like, phase inversion may occur when basic neutralization agent, optional surfactant, and optional water have been added so that the resulting resin is present in an amount from about 30% to about 70% by weight of the emulsion, in embodiments from about 35% to about 65% by weight of the emulsion, in other embodiments from about 40% to about 60% by weight of the emulsion.

At phase inversion, the resin particles become emulsified and dispersed within the aqueous phase. That is, an oil-in-water emulsion of the resin particles in the aqueous phase is formed. Phase inversion may be confirmed by, for example, measuring via any of the techniques described in, for example, Z. Yang et al., "Preparations of Waterborne Dispersions of Epoxy Resin by the Phase-Inversion Emulsification Technique," Colloid Polym Sci, vol. 278, pgs 1164-1171 (2000), incorporated herein by reference.

The phase inversion method permits the emulsion to be formed at temperatures while avoiding premature crosslinking of the resin of the emulsion.

Following phase inversion, additional surfactant, water, and/or aqueous alkaline solution may optionally be added to dilute the phase inversed emulsion, although this is not required. Any additional surfactant, water, or aqueous alkaline solution may be added at a more rapid rate than the metered rate above. Following phase inversion, the phase inversed emulsion may be cooled to room temperature, for example from about 20° C. to about 25° C.

The emulsified resin particles in the aqueous medium may have a size from about 100 nm to about 3 microns, in embodiments from about 130 nm to about 2 microns, in other embodiments from about 150 nm to about 1.5 microns, in some embodiments about 800 nm.

In further embodiments, the present invention also provides processes for producing toner particles without an organic solvent. In embodiments, a process of the present disclosure includes melt mixing a resin at an elevated temperature in the absence of an organic solvent as discussed above; optionally adding a surfactant either before, during or after melt mixing the resin; optionally adding one or more additional ingredients of a toner composition such as colorant, wax, charge control agents, and other additives; adding a basic agent and water; performing a phase inversion in an acoustic mixer to create a phase inversed emulsion including a disperse phase comprising toner-sized droplets including the molten resin and the optional ingredients of the toner composition; and solidifying the toner-sized droplets to result in toner particles.

In embodiments, the optional additional ingredients of a toner composition including colorant, wax, charge control agents, and other additives, may be added before, during or after the melt mixing the resin. The additional ingredients can be added before, during or after the addition of the optional surfactant. In further embodiments, the colorant may be added before the addition of the optional surfactant.

Toner Preparation

As noted above, a toner of the present disclosure may include a resin, optionally a colorant (the toner composition is referred to as "colorless" or "clear" where a colorant is not used), optionally a wax, and optionally a charge control agent. In embodiments, prior to performing the phase inversion described above, all of the toner ingredients, for example resin, aqueous alkaline solution, wax, colorant, and charge control agent, may be combined so that toner particles are formed upon phase inversion. In other embodiments, the phase inversion may be performed as described above to produce a resin emulsion, with the remaining toner ingredients added subsequent to the emulsion to form toner particles by any suitable manner within the purview of one skilled in the art.

Thus, in embodiments, prior to performing the phase inversion, "internal" toner ingredients, including resin, colorant, wax, and internal charge control agent, may be present in the mixture and it is optional to include the "external" toner ingredients prior to performing the phase inversion. The terms "internal" and "external" refer to whether the toner ingredients are found throughout the resulting toner particles or just on the surface thereof. In embodiments, prior to performing the phase inversion, the ingredients of the toner composition may be blended by melt-mixing at any suitable temperature of from about 60° C. to about 200° C., and a time of from about 10 minutes to about 10 hours.

For the phase inversed emulsion, the ingredient(s) of the toner composition may be present in an amount by weight of from about 5% to about 35% of the phase inversed emulsion, in embodiments from about 5% to about 20% of the phase inversed emulsion, in other embodiments from about 10% to about 20% of the phase inversed emulsion.

Catalyst

In embodiments, the phase inversed emulsion may also have included therein a hardener or catalyst for crosslinking the resin. The catalyst may be a thermal crosslinking catalyst, for example a catalyst that initiates crosslinking at temperatures of, for example, about 160° C. or less, such as, from about 50° C. to about 160° C. or from about 100° C. to about 150° C. Examples of suitable crosslinking catalysts (to crosslink for instance an epoxy resin) include, for example, blocked acid catalysts such as available from King Industries under the name NACURE, for example including NACURE SUPER XC-7231 and NACURE XC-AD230. Other known catalysts to initiate crosslinking may also be used, for example including catalysts such as aliphatic amines and alicyclic amines, for example bis(4-aminocyclohexyl)methane, bis(aminomethyl)cyclohexane, m-xylenediamine, and 3,9-bis(3-aminopropyl)-2,4,8, 10-tetraspiro[5,5]undecane; aromatic amines, for example metaphenylene diamine, diaminodiphenylmethane, and diaminodiphenyl sulfone; tertiary amines and corresponding salts, for example benzyldimethylamine, 2,4,6-tris(dimethylaminomethyl)phenol, 1,8-diazabicyclo(5,4,0)undecene-7,1,5-diazabicyclo(4,3,0) nonene-7; aromatic acid anhydrides, for example phthalic anhydride, trimellitic anhydride, and pyromellitic anhydride; alicyclic carboxylic anhydrides, for example tetrahydrophthalic anhydride, methyltetrahydrophthalic anhydride, hexahydrophthalic anhydride, methylhexahydrophthalic anhydride, methylendomethylenetetrahydrophthalic anhydride, dodecenylsuccinic anhydride, and trialkyltetrahydrophthalic anhydrides; polyvalent phenols, for example catechol, resorcinol, hydroquinone, bisphenol F, bisphenol A, bisphenol S, biphenol, phenol novolac compounds, cresol novolac compounds, novolac compounds of divalent phenols such as bisphenol A, trishydroxyphenylmethane, aralkylpolyphenols, and dicyclopentadiene polyphenols; imidazoles and salts thereof, for example 2-methylimidazole, 2-ethyl-4-methylimidazole, and 2-phenylimidazole; $BF_3$ complexes of amine; Bronsted acids, for example aliphatic sulfonium salts and aromatic sulfonium salts; dicyandiamide; organic acid hydrazides, for example adipic acid dihydrazide and phthalic acid dihydrazide; resols; polycarboxylic acids, for example adipic acid, sebacic acid, terephthalic acid, trimellitic acid, polyester resins containing carboxylic groups; organic phosphines; combinations thereof and the like. The catalyst may be included in an amount of from, for example, about 0.01% to about 20% by weight of the phase inversed emulsion, such as from about 0.05% to about 10% or from about 0.1% to about 10% by weight of the phase inversed emulsion.

If a catalyst is used, the catalyst may be incorporated into the toner composition by, for instance, melt mixing prior to the phase inversion. In other embodiments, the catalyst may be added to the toner composition subsequent to the phase inversion.

In embodiments, the phase inversed emulsion has good storage stability, for example being able to remain substantially stable over time at room temperature conditions.

Aggregation and Coalescence

In embodiments, toners may be prepared by a process that includes aggregating a mixture of a colorant, optionally a wax, charge control agents, and any other desired or required additives, and the phase inversed emulsion including the resin, and then optionally coalescing the aggregated particles.

In embodiments, a method of making the toner particles including the resin may include admixing and heating the phase inversed emulsion of resin described above and a colorant dispersion, an optional wax dispersion and other additives and adding thereto an aqueous solution containing an aggregating agent, and optionally cooling and optionally adding the wax, and other additives. For example, the toner may be formed in a process including admixing the phase inversed emulsion of resins and a colorant dispersion at a temperature of from about 30° C. to about 100° C., in embodiments from about 40° C. to about 90° C., in other embodiments from about 45° C. to about 80° C., and adding thereto an aggregating agent solution until aggregated particles of a desired volume average diameter are achieved, cooling and isolating the resulting toner, optionally washing with water, and drying the toner. The aforementioned temperatures for aggregation may be from about 3° C. to about 15° C. below the glass transition temperature of the resin, for example from about 4° C. to about 10° C. below the glass transition temperature or from about 5° C. to about 8° C. below the glass transition temperature.

For forming toner particles, the solids content of the starting phase inversed resin emulsion may be from about 5% to about 50% of the phase inversed emulsion, in embodiments from about 5% to about 20% of the phase inversed emulsion, in other embodiments from about 10% to about 30% of the phase inversed emulsion. To achieve this solids content, the phase inversed emulsion may be diluted during formation as discussed above, or additional water may be added as discussed above to effect dilution during the toner particle formation process.

Any suitable aggregating agent may be utilized to form a toner. Suitable aggregating agents include, for example, halides such as chloride, bromide or iodide, or anions such as acetates, acetoacetates or sulfates, of vanadium, niobium, tantalum, chromium, molybdenum, tungsten, manganese, iron, ruthenium, cobalt, nickel, copper, zinc, cadmium and/or silver; aluminum salts such as aluminum sulfate, aluminum acetate, polyaluminum chloride and/or aluminum halides; mixtures thereof and the like. Alkali (II) metal salts, that is divalent alkali metal salts, that may be used as aggregating agents may include, for example, beryllium chloride, beryllium bromide, beryllium iodide, beryllium acetate, beryllium sulfate, magnesium chloride, magnesium bromide, magnesium iodide, magnesium acetate, magnesium sulfate, calcium chloride, calcium bromide, calcium iodide, calcium acetate, calcium sulfate, strontium chloride, strontium bromide, strontium iodide, strontium acetate, zinc acetate, strontium sulfate, barium chloride, barium bromide, barium iodide, or mixtures thereof.

The aggregating agent may be added to the mixture utilized to form a toner in an amount of, for example, from about 0.1% to about 8% by weight, in embodiments from about 0.2% to about 5% by weight, in other embodiments from about 0.5% to about 5% by weight, of the resin in the mixture. This provides a sufficient amount of agent for aggregation.

In order to control aggregation and coalescence of the particles, in embodiments the aggregating agent may be metered into the mixture over time. For example, the agent may be metered into the mixture over a period of from about 5 to about 240 minutes, in embodiments from about 30 to about 200 minutes, although more or less time may be used as desired or required. The addition of the agent may also be done while the mixture is maintained under stirred conditions, in embodiments from about 50 rpm to about 1,000 rpm, in other embodiments from about 100 rpm to about 500 rpm, and elevated temperature as discussed above.

The particles may be permitted to aggregate and/or coalesce until a predetermined desired particle size is obtained. A predetermined desired size refers to the desired particle size to be obtained as determined prior to formation, and the particle size being monitored during the growth process until such particle size is reached. Samples may be taken during the growth process and analyzed, for example with a Coulter Counter, for average particle size. The aggregation/coalescence thus may proceed by maintaining the elevated temperature, or slowly raising the temperature to, for example, from about 30° C. to about 100° C., and holding the mixture at this temperature for a time from about 0.5 hours to about 10 hours, in embodiments from about 1 hour to about 5 hours, while maintaining stirring, to provide the aggregated particles.

Once the predetermined desired particle size is reached, then the growth process is halted. In embodiments, the predetermined desired particle size is within the toner particle size ranges mentioned above.

The growth and shaping of the particles following addition of the aggregation agent may be accomplished under any suitable conditions. For example, the growth and shaping may be conducted under conditions in which aggregation occurs separate from coalescence. For separate aggregation and coalescence stages, the aggregation process may be conducted under shearing conditions at an elevated temperature, for example of from about 40° C. to about 90° C., in embodiments from about 45° C. to about 80° C., which may be below the glass transition temperature of the resin as discussed above.

Following aggregation to the desired particle size, the particles may then be coalesced to the desired final shape, the coalescence being achieved by, for example, heating the mixture to a temperature of from about 50° C. to about 95° C., in embodiments from about 65° C. to about 90° C., in embodiments from about 70° C. to about 88° C., and/or increasing the stirring, for example to from about 400 rpm to about 1,000 rpm, in embodiments from about 500 rpm to about 800 rpm. Higher or lower temperatures may be used, it being understood that the temperature is a function of the resins used for the binder. Coalescence may be accomplished over a period of time of from about 0.1 hours to about 6 hours, in embodiments from about 0.5 hours to about 4 hours, in embodiments from about 1 hour to about 3 hours.

After aggregation and/or coalescence, the mixture may be cooled to room temperature, such as from about 20° C. to about 25° C. The cooling may be rapid or slow, as desired. A suitable cooling method may include introducing cold water to a jacket around the reactor. After cooling, the toner particles may be optionally washed with water, and then dried. Drying may be accomplished by any suitable method for drying including, for example, freeze-drying.

Additives

In embodiments, the toner particles may also contain other optional additives, as desired or required. For example, the toner may include positive or negative charge control agents, for example in an amount of from about 0.1 to about 10 percent by weight of the toner, in embodiments from about 1 to about 3 percent by weight of the toner. Examples of suitable charge control agents include quaternary ammonium compounds inclusive of alkyl pyridinium halides; bisulfates; alkyl pyridinium compounds, including those disclosed in U.S. Pat. No. 4,298,672, the disclosure of which is hereby incorporated by reference in its entirety; organic sulfate and sulfonate compositions, including those disclosed in U.S. Pat. No. 4,338,390, the disclosure of which is hereby incorporated by reference in its entirety; cetyl pyridinium tetrafluoroborates; distearyl dimethyl ammonium methyl sulfate; aluminum salts such as BONTRON E84™ or E88™ (Hodogaya Chemical); combinations thereof, and the like.

There can also be blended with the toner particles external additive particles including flow aid additives, which additives may be present on the surface of the toner particles. Examples of these additives include metal oxides such as titanium oxide, silicon oxide, tin oxide, mixtures thereof, and the like; colloidal silicas, such as AEROSIL®, metal salts and metal salts of fatty acids inclusive of zinc stearate, aluminum oxides, cerium oxides, and mixtures thereof. Each of these external additives may be present in an amount of from about 0.1 percent by weight to about 5 percent by weight of the toner, in embodiments of from about 0.25 percent by weight to about 1 percent by weight of the toner. Suitable additives include those disclosed in U.S. Pat. Nos. 3,590,000, and 6,214,507, the disclosures of each of which are hereby incorporated by reference in their entirety.

In embodiments, the dry toner particles, exclusive of external surface additives, may have the following characteristics:

(1) Volume average diameter (also referred to as "volume average particle diameter") of from about 2 microns to about 12 microns, in embodiments from about 3 microns to about 9 microns, in other embodiments from about 3.5 microns to about 7 microns.

(2) Number Average Geometric Size Distribution (GSDn) of from about 1 to about 2, in embodiments from about 1.1 to about 1.6, in embodiments from about 1.15 to about 1.3, and/or Volume Average Geometric Size Distribution (GSDv) of from about 1 to about 1.8, in embodiments from about 1.1 to about 1.3, in embodiments from about 1.15 to about 1.25.

(3) Circularity of from about 0.9 to about 1 (measured with, for example, a Sysmex FPIA 2100 analyzer), in embodiments from about 0.92 to about 0.99, in embodiments from about 0.94 to about 0.97.

The characteristics of the toner particles may be determined by any suitable technique and apparatus. Volume average particle diameter $D_{50v}$, GSDv, and GSDn may be measured by means of a measuring instrument such as a Beckman Coulter Multisizer 3, operated in accordance with the manufacturer's instructions. Representative sampling may occur as follows: a small amount of toner sample, about 1 gram, may be obtained and filtered through a 25 micrometer screen, then put in isotonic solution to obtain a concentration of about 10%, with the sample then run in a Beckman Coulter Multisizer 3.

In embodiments, the above toner particle characteristics may be determined subsequent to the solidifying the toner-sized droplets to result in the toner particles and after any optional processing, such as filtering.

Developers

The toner particles may be formulated into a developer composition. The toner particles may be mixed with carrier particles to achieve a two-component developer composition. The toner concentration in the developer may be from about 1% to about 25% by weight of the total weight of the developer, in embodiments from about 2% to about 15% by weight of the total weight of the developer.

Carriers

Examples of carrier particles that can be utilized for mixing with the toner include those particles that are capable of triboelectrically obtaining a charge of opposite polarity to that of the toner particles. Illustrative examples of suitable carrier particles include granular zircon, granular silicon, glass, steel, nickel, ferrites, iron ferrites, silicon dioxide, and the like. Other carriers include those disclosed in U.S. Pat. Nos. 3,847,604, 4,937,166, and 4,935,326.

The selected carrier particles can be used with or without a coating. In embodiments, the carrier particles may include a core with a coating thereover which may be formed from a mixture of polymers that are not in close proximity thereto in the triboelectric series. The coating may include fluoropolymers, such as polyvinylidene fluoride resins, terpolymers of styrene, methyl methacrylate, and/or silanes, such as triethoxy silane, tetrafluoroethylenes, other known coatings and the like. For example, coatings containing polyvinylidenefluoride, available, for example, as KYNAR 301F™, and/or polymethylmethacrylate, for example having a weight average molecular weight of about 300,000 to about 350,000, such as commercially available from Soken, may be used. In embodiments, polyvinylidenefluoride and polymethylmethacrylate (PMMA) may be mixed in proportions of from about 30 to about 70 weight % to about 70 to about 30 weight %, in embodiments from about 40 to about 60 weight % to about 60 to about 40 weight %. The coating may have a coating weight of, for example, from about 0.1 to about 5% by weight of the carrier, in embodiments from about 0.5 to about 2% by weight of the carrier.

In embodiments, PMMA may optionally be copolymerized with any desired comonomer, so long as the resulting copolymer retains a suitable particle size. Suitable comonomers can include monoalkyl, or dialkyl amines, such as a dimethylaminoethyl methacrylate, diethylaminoethyl methacrylate, diisopropylaminoethyl methacrylate, or t-butylaminoethyl methacrylate, and the like. The carrier particles may be prepared by mixing the carrier core with polymer in an amount from about 0.05 to about 10 percent by weight, in embodiments from about 0.01 percent to about 3 percent by weight, based on the weight of the coated carrier particles, until adherence thereof to the carrier core by mechanical impaction and/or electrostatic attraction.

Various effective suitable means can be used to apply the polymer to the surface of the carrier core particles, for example, cascade roll mixing, tumbling, milling, shaking, electrostatic powder cloud spraying, fluidized bed, electrostatic disc processing, electrostatic curtain, combinations thereof, and the like. The mixture of carrier core particles and polymer may then be heated to enable the polymer to melt and fuse to the carrier core particles. The coated carrier particles may then be cooled and thereafter classified to a desired particle size.

In embodiments, suitable carriers may include a steel core, for example of from about 25 to about 100 microns in size, in embodiments from about 50 to about 75 microns in size, coated with about 0.5% to about 10% by weight, in embodiments from about 0.7% to about 5% by weight, of a conductive polymer mixture including, for example, methylacrylate and carbon black using the process described in U.S. Pat. Nos. 5,236,629 and 5,330,874.

The carrier particles can be mixed with the toner particles in various suitable combinations. The concentrations are may be from about 1% to about 20% by weight of the toner composition. However, different toner and carrier percentages may be used to achieve a developer composition with desired characteristics.

Imaging

The toners can be utilized for electrostatographic or xerographic processes, including those disclosed in U.S. Pat. No. 4,295,990, the disclosure of which is hereby incorporated by reference in its entirety. In embodiments, any known type of image development system may be used in an image developing device, including, for example, magnetic brush development, jumping single-component development, hybrid scavengeless development (HSD), and the like. These and similar development systems are within the purview of those skilled in the art.

Imaging processes include, for example, preparing an image with a xerographic device including a charging component, an imaging component, a photoconductive component, a developing component, a transfer component, and a fusing component. In embodiments, the development component may include a developer prepared by mixing a carrier with a toner composition described herein. The xerographic device may include a high speed printer, a black and white high speed printer, a color printer, and the like.

Once the image is formed with toners/developers via a suitable image development method such as any one of the aforementioned methods, the image may then be transferred to an image receiving medium such as paper and the like. In embodiments, the toners may be used in developing an image in an image-developing device utilizing a fuser roll member. Fuser roll members are contact fusing devices that are within the purview of those skilled in the art, in which heat and pressure from the roll may be used to fuse the toner to the image-receiving medium. In embodiments, the fuser member may be heated to a temperature above the fusing temperature of the toner, for example to temperatures of from about 70° C. to about 210° C., in embodiments from about 80° C. to about 205° C., in other embodiments from about 90° C. to about 200° C., after or during melting onto the image receiving substrate.

In embodiments where the toner resin is crosslinkable, such crosslinking may be accomplished in any suitable manner. For example, the toner resin may be crosslinked during fusing of the toner to the substrate where the toner resin is crosslinkable at the fusing temperature. Crosslinking also may be effected by heating the fused image to a temperature at which the toner resin will be crosslinked, for example in a post-fusing operation. In embodiments, crosslinking may be effected at temperatures of from about 160° C. or less, in embodiments from about 70° C. to about 160° C., in other embodiments from about 80° C. to about 140° C.

The following Examples are being submitted to illustrate embodiments of the present disclosure. These Examples are intended to be illustrative only and are not intended to limit the scope of the present disclosure. Also, parts and percentages are by weight unless otherwise indicated. As used herein, "room temperature" refers to a temperature of from about 20° C. to about 25° C.

EXAMPLES

Example 1

About 50 grams of an amorphous polyester resin of the formula:

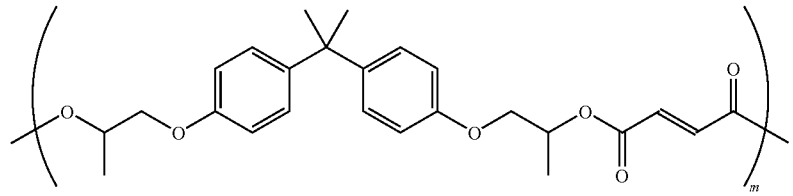

wherein m may be from about 5 to about 1000, having a molecular weight of about 25,000 gram/mol as measured by gel permeation chromatography (GPC), was combined with about 9 grams of TAYCA POWER BN2060 from Tayca Corporation (Japan), a branched sodium dodecyl benzene sulfonate, (about 6 percent by weight based on the total weight of the resin) were charged into an acoustic mixer (a LABRAM mixer from Resodyn Acoustic Mixers, Inc. (Butte, Mont.)) and mixed at about 92° C. for about 5 minutes. About 10 mL of an NaOH solution was fed into the mixture over about 5 minutes to neutralize the resin with a neutralization ratio of about 1.5 (150%). Once all the NaOH solution had been added, mixing continued for about another 10 minutes, after which about 100 grams of deionized water at a temperature of about 90° C. was added over about 30 minutes at a constant addition rate. At the conclusion of the hot water feed, the emulsion was mixed for about another 10 minutes and then cooled to room temperature.

The final latex had an average particle size of about 170 nm (as determined with a Honeywell MICROTRAC®UPA 150 particle size analyzer) with a single peak and width of about 0.07, was about 30% by weight solids, and had a pH of about 9.This latex was very stable and sediment-free.

Example 2

About 66 grams of an amorphous polyester resin of the formula:

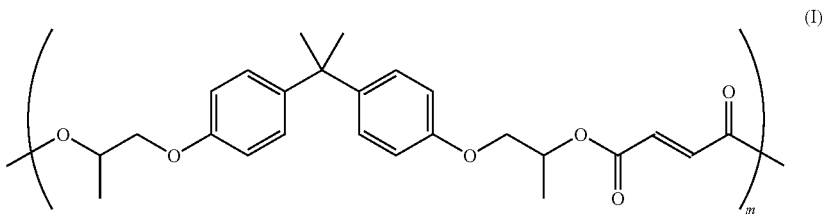

wherein m may be from about 5 to about 1000, having a molecular weight of about 25,000 gram/mol as measured by gel permeation chromatography (GPC), was combined with about 8 grams of a crystalline polyester resin (produced from dodecanedioic acid and nonanediol/neopentyl glycol (C10/9)), about 7 grams of a black pigment, Regal 330, about 11 grams of a refined paraffin wax dispersion (from IGI, at about 30% by weight), and about 9 grams of a TAYCA POWER BN2060 from Tayca Corporation (Japan), a branched sodium dodecyl benzene sulfonate, (about 6 percent by weight based on the total weight of the resin) in an acoustic mixer (a LABRAM mixer from Resodyn Acoustic Mixers, Inc. (Butte, Mont.)) and mixed at about 95° C. for about 10 minutes.

About 15 mL of an NaOH solution was fed into the mixture over about 10 minutes to neutralize the resin with a neutralization ratio of about 1.0 (150%). Once all the NaOH solution had been added, mixing continued for about another 10 minutes, after which about 100 grams of deionized water at a temperature of about 90° C. was added over about 30 minutes at a constant addition rate. At the conclusion of the hot water feed, the emulsion was mixed for about another 10 minutes and then cooled to room temperature.

The final mixture was in a gel form. The particle size of the gel mixture was 250 nm (as determined with a Honeywell MICROTRAC®UPA 150 particle size analyzer), with relatively narrow size distribution as shown in FIG. 1.

Example 3

Toner preparation with phase-inversed aggregation. The above gel mixture prepared in Example 1 was further diluted into a slurry form with deionized water and then transferred into a 2 liter stainless steel reactor. After adjusting the pH to 4.5 with about 0.3M HNO3, about 1.0 parts of a 10% by weight aluminum sulfate solution in water was added into the mixture over a period of about 5 minutes. The resulting viscous mixture was continuously mixed for another 20 minutes at about 600 revolutions per minute (rpm) with a dual impeller mixer.

Figure 2:
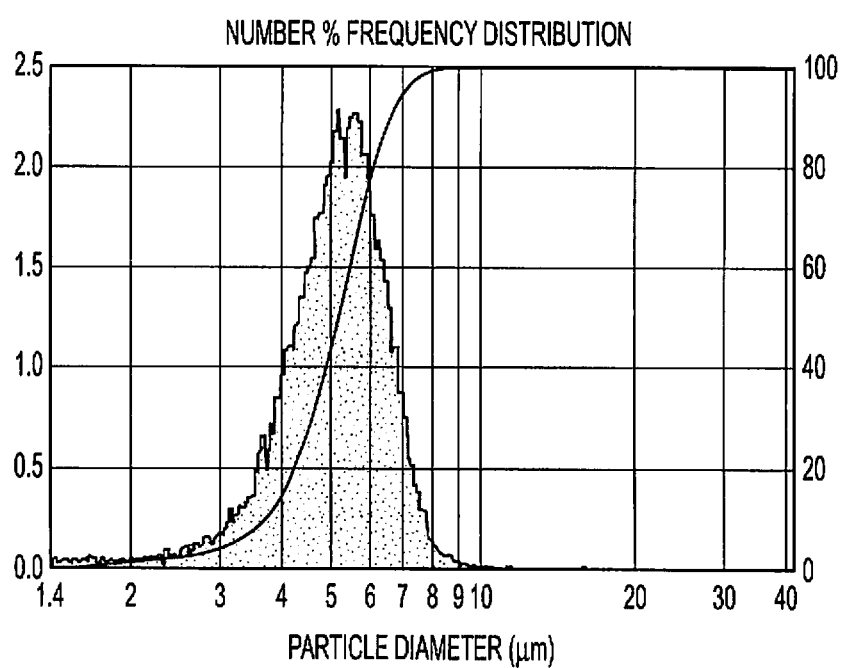
FIG. 2 is a graph showing particle size (number) distribution of a toner produced in accordance with the present disclosure.
Figure 3:
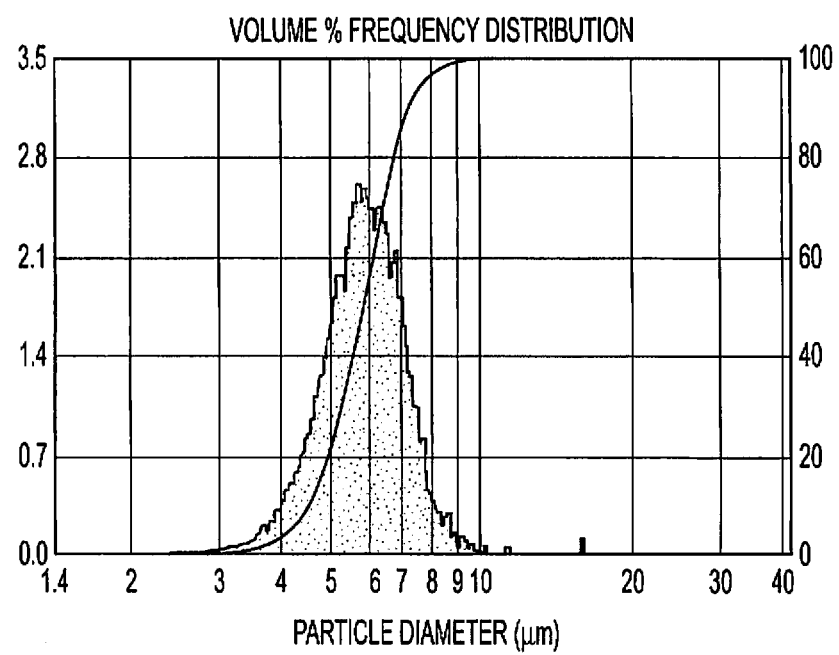
FIG. 3 is a graph showing particle size (volume) distribution of a toner produced in accordance with the present disclosure.

The temperature of the mixture was then raised to about 45° C. over a period of about 35 minutes. After the particles reached a size of about 4.8 microns (as determined by a Layson Cell particle analyzer), a shell coating was added dropwise to the particles over a period of about 15 minutes. The shell coating included an emulsion possessing about 15 parts of the polyester amorphous latex from Example 1 above at a solids content of about 35 percent by weight. After the particle size reached about 6.0 microns, the pH of the solution was adjusted to about 7.5 by the addition of about 4 percent by weigh of a sodium hydroxide solution and ethylenediamine tetraacetic acid (EDTA) and held for about 30 minutes. After 30 minutes, the temperature of the mixture was raised to about 80° C. over a period of about 35 minutes, and then stirred at a rate of about 200 rpm for about 60 minutes while maintaining the temperature at about 80° C. After stirring, the mixture was quenched by cooling to a temperature of about 40° C. The mixture was then washed with deionized water, and dried at about 48° C. The final toner product had a volume median particle size of about 5.8 microns, with a circularity of about 0.968, as determined by a Beckman Coulter Multisizer 3, operated in accordance with the manufacturer's instructions. The particle size and size distribution are shown in FIGS. 2 and 3.

Comparative Example 1

Black toner was prepared with dispersions including individual ingredients of the toner composition. Briefly, in a 2 liter stainless steel reactor, about 100 parts of the polyester amorphous latex from Example 2 above, at a solids content of about 35 percent by weight, was combined with about 13 parts of the crystalline polyester latex from Example 2 above, at a solids content of about 30 percent by weight (both of the latexes were made by a phase inversion process with solvents), about 20 parts of the wax dispersion, at a solids content of about 30 percent by weight, about 25 parts black pigment dispersion, at a solids content of about 17 percent by weight, and about 160 parts deionized water. The wax and pigment dispersion were pre-made and commercially available (the wax was D1508 wax from Baker Petrolite, and the pigment dispersion was a carbon black dispersion available as Regal 330 from Cabot). This solution was adjusted to a pH of about 3.2 using 0.3M $HNO_3$ acid. To this solution was added, under homogenization at about 2,000 rpm, about 15 parts of a 1% by weight aluminum sulfate solution in water over a period of about 5 minutes.

The reactor was then stirred at about 600 rpm and heated to about 45° C. to aggregate the toner particles. When the size of the particles reached about 5.0 microns, a shell coating was added which included about 15 parts of the amorphous latex from Example 1 above. The reaction was then heated to about 46° C. When the toner particle size reached about 5.8 microns, the pH was adjusted to about 5.0 using a 4% NaOH solution, followed by the addition of 2.5 parts of EDTA (commercially available as VERSENE 100).

The pH was then adjusted and maintained at about 7.5 and the toner solution was heated to the coalescence temperature of about 85° C. When the coalescence temperature was reached, the pH was lowered to about 7.3 to allow spheroidization (coalescence) of the toner. After about 3 hours, the circularity of the particles was about 0.968 as determined by a FPIA 2000, from Sysmex. The toner was then quenched by cooling to less than 40° C. through a heat exchanger. After cooling, the toners were washed to remove any residual surfactants and ions and dried to a moisture content below about 1.2 percent by weight.

Toners from this Comparative Example 1 were compared with the toner produce in Example 3. Particle size, number average geometric size distribution (GSDn), volume average geometric size distribution (GSDv), triboelectric charge, and other properties of the toner are set forth below in Table 1.

TABLE 1

| | Comparison of toner Particle Properties | | | | | | | |
|---|---|---|---|---|---|---|---|---|
| | Particle Size (microns) | GSDn | GSDv | Coalescence Temp. (° C.) | Coalescence time (hr) | Circularity | Tg (° C.) | Tribo (q/m) |
| Example 3 | 5.81 | 1.24 | 1.21 | 80 | 1 | 0.968 | 51.0 | 48 |
| Comparative Example 1 | 5.86 | 1.26 | 1.23 | 85 | 3 | 0.967 | 51.2 | 47 |

As shown in Table 1 above, the particles prepared by the process of the present disclosure (Example 3) had similar properties compared with the toners of Comparative Example 1, with reduced coalescence time at a lower coalescence temperature. The resulting toner particles also show improved GSD. The Tg and triboelectric charge (tribo (q/m)) were almost the same, demonstrating that the process utilized to prepare the toner of the present disclosure had minimal impact on the final toner properties.

It was also found that the particle shape could be varied and finely tuned where the processes of the present disclosure were utilized. The shape of the particles could be made spherical, potato shape, or needle shape. For example, to make needle shape particles, the slurry viscosity was adjusted by adding different amount of surfactants and deionized water. To make spherical shape particles, the coalescence time was extended.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims. Unless specifically recited in a claim, steps or components of claims should not be implied or imported from the specification or any other claims as to any particular order, number, position, size, shape, angle, color, or material.

What is claimed is:

1. A process comprising:
   melt mixing a resin in the absence of an organic solvent;
   optionally adding a surfactant to the resin;
   adding one or more additional ingredients of a toner composition to the resin to form a mixture;
   adding to the mixture a basic agent and water;
   subjecting the mixture to acoustic mixing at a frequency of from about 15 Hertz to about 2000 Hertz to form an emulsion;
   performing a phase inversion to create a phase inversed emulsion including a disperse phase comprising molten resin and the optional ingredients of the toner composition;
   solidifying toner-sized droplets from the disperse phase into toner particles; and
   recovering the toner particles,
   wherein the toner particles have a volume average diameter of from about 2 microns to about 12 microns.

2. The process according to claim 1, wherein the resin comprises a polyester resin possessing acid groups selected from the group consisting of amorphous resins, crystalline resins, and combinations thereof.

3. The process according to claim 2, wherein the resin is an amorphous resin and the melt mixing is performed at a temperature above the glass transition temperature of the resin.

4. The process according to claim 2, wherein the resin is a crystalline resin and the melt mixing is performed at a temperature above the melting point of the resin.

5. The process according to claim 2, wherein the resin is a combination of amorphous resins and crystalline resins and the melt mixing is performed at a temperature above the glass transition temperature of the mixture.

6. The process according to claim 1, wherein melt mixing the resin occurs at temperature of from about 30° C. to about 300° C.

7. The process according to claim 1, wherein the basic agent is selected from the group consisting of ammonium hydroxide, potassium hydroxide, sodium hydroxide, sodium carbonate, sodium bicarbonate, lithium hydroxide, potassium carbonate, organoamines, and combinations thereof.

8. The process according to claim 1, wherein the surfactant is selected from the group consisting of anionic surfactants, nonionic surfactants, cationic surfactants, and combinations thereof, and the surfactant is present in an amount from about 0.01% to about 20% by weight of the resin.

9. The process according to claim 1, wherein the addition of the basic agent raises the pH of the emulsion of resin particles to from about 5 to about 9, and wherein the acoustic mixing occurs in an acoustic mixer lacking impellers.

10. The process according to claim 1, wherein the toner particles possess a Number Average Geometric Size Distribution of from about 1 to about 2, and a Volume Average Geometric Size Distribution of from about 1 to about 1.8.

11. A process comprising:
    melt mixing a resin in the absence of an organic solvent;
    optionally adding a surfactant to the resin;
    adding a colorant and one or more additional optional ingredients of a toner composition to the resin to form a mixture;
    adding to the mixture a basic agent and water;
    subjecting the mixture to acoustic mixing at a frequency of from about 15 Hertz to about 2000 Hertz to form an emulsion;
    performing a phase inversion to create a phase inversed emulsion including a disperse phase comprising molten resin and the ingredients of the toner composition;
    solidifying toner-sized droplets from the disperse phase into toner particles;
    aggregating and coalescing the toner particles; and recovering the toner particles, wherein coalescing the toner particles occurs at a temperature of from about 50 to about 95° C. for a period of time of from about 0.1 hours to about 6 hours.

12. The process according to claim 11, wherein melt mixing the resin occurs at a temperature of from about 50° C. to about 200° C.

13. The process according to claim 11, wherein the resin comprises a polyester resin possessing acid groups.

14. The process according to claim 11, wherein the surfactant is selected from the group consisting of anionic surfactants, nonionic surfactants, cationic surfactants, and combinations thereof, and the surfactant is present in an amount from about 0.1% to about 10% by weight of the resin.

15. The process according to claim 11, wherein the addition of the basic agent raises the pH of the emulsion of resin particles to from about 6 to about 8, and wherein the acoustic mixing occurs in an acoustic mixer lacking impellers.

16. The process of claim 11, wherein the resin is of the formula:

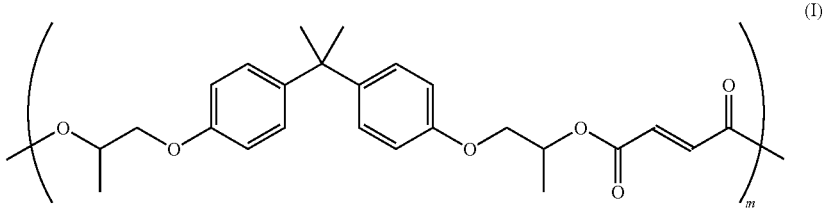

wherein m is from about 5 to about 1000, and the one or more additional optional ingredients of the toner composition are selected from the group consisting of waxes, charge control agents, and combinations thereof.

17. The process according to claim 11, wherein the toner particles have a volume average diameter of from about 2 microns to about 12 microns, a Number Average Geometric Size Distribution of from about 1 to about 2, and a Volume Average Geometric Size Distribution of from about 1 to about 1.8.

18. A process comprising:
melt mixing at least one polyester resin in the absence of an organic solvent;
optionally adding a surfactant to the resin;
adding a colorant and one or more additional optional ingredients of a toner composition to the resin to form a mixture;
adding to the mixture a basic agent and water;
subjecting the mixture to acoustic mixing in an acoustic mixer lacking impellers at a frequency of from about 15 Hertz to about 2000 Hertz to form an emulsion;
performing a phase inversion to create a phase inversed emulsion including a disperse phase comprising molten resin and the ingredients of the toner composition;
solidifying toner-sized droplets from the disperse phase into toner particles;
aggregating and coalescing the toner particles; and recovering the toner particles, wherein coalescing the toner particles occurs at a temperature of from about 50° C. to about 95° C. for a period of time of from about 0.1 hours to about 6 hours, and wherein the toner particles have a volume average diameter of from about 2 microns to about 12 microns, a Number Average Geometric Size Distribution of from about 1 to about 2, and a Volume Average Geometric Size Distribution of from about 1 to about 1.8.

19. The process of claim 18, wherein the at least one polyester resin has an acid number from about 2 mg KOH/g resin to about 200 mg KOH/g resin, and wherein the neutralization ratio is from about 50% to about 300%.

20. The process according to claim 18, wherein the at least one polyester resin is selected from the group consisting of amorphous resins, crystalline resins, and combinations thereof, the surfactant is selected from the group consisting of anionic surfactants, nonionic surfactants, cationic surfactants, and combinations thereof.

* * * * *